United States Patent
Bucher et al.

(10) Patent No.: US 8,933,149 B2
(45) Date of Patent: Jan. 13, 2015

(54) DRAG REDUCING COMPOSITIONS AND METHODS OF MANUFACTURE AND USE

(71) Applicants: Brad A. Bucher, Houston, TX (US); Tom M. Weatherford, Magnolia, TX (US)

(72) Inventors: Brad A. Bucher, Houston, TX (US); Tom M. Weatherford, Magnolia, TX (US)

(73) Assignee: Flowchem, Ltd., Waller, TX (US)

( * ) Notice: Subject to any disclaimer, the term of this patent is extended or adjusted under 35 U.S.C. 154(b) by 0 days.

(21) Appl. No.: 13/791,093

(22) Filed: Mar. 8, 2013

(65) Prior Publication Data
US 2014/0206794 A1    Jul. 24, 2014

Related U.S. Application Data

(60) Provisional application No. 61/755,190, filed on Jan. 22, 2013.

(51) Int. Cl.
*B05D 5/08*    (2006.01)
*C08L 23/24*    (2006.01)

(52) U.S. Cl.
CPC ..................... *C08L 23/24* (2013.01)
USPC ........................... 523/175; 523/122

(58) Field of Classification Search
CPC ..................... B05D 5/08; C09K 3/00
USPC ........................................... 523/175
See application file for complete search history.

(56) References Cited

U.S. PATENT DOCUMENTS

| 6,172,151 B1 | 1/2001 | Johnston et al. |
| 2008/0287331 A1 | 11/2008 | Lin et al. |
| 2012/0123019 A1 | 5/2012 | Johnston et al. |

FOREIGN PATENT DOCUMENTS

WO    WO 2009/151576    12/2009

*Primary Examiner* — Edward Cain
(74) *Attorney, Agent, or Firm* — Bushman Werner, P.C.

(57) ABSTRACT

A drag reducing composition comprising a finely divided, solid polyolefin friction reducing agent formed from olefins containing from 2 to 30 carbon atoms, the polyolefin drag reducing agent suspended in a suspending medium and comprising 2,2,4-trimethyl-1,3-pentanediol monoisobutyrate containing up to 10% by weight of water.

15 Claims, No Drawings

DRAG REDUCING COMPOSITIONS AND METHODS OF MANUFACTURE AND USE

CROSS REFERENCE TO RELATED APPLICATION

This application claims priority to U.S. Application No. 61/755,190 filed on Jan. 22, 2013, the disclosure of which is incorporated herein by reference for all purposes.

FIELD OF THE INVENTION

The present invention relates to compositions for reducing friction in the flow of hydrocarbons such as crude oil or refined products in conduits such as pipelines, and to methods for producing and using such compositions.

BACKGROUND OF THE INVENTION

The prior art abounds with patents directed to generally non-crystalline, high molecular weight polyolefin, particularly polyalphaolefins, compositions which are generally hydrocarbon soluble and, when dissolved in a hydrocarbon fluid flowing through a conduit, greatly reduce turbulent flow and decrease "drag." This reduction of drag is important since it reduces the amount of horsepower needed to move a given volume of hydrocarbon, or conversely enables greater volumes of fluid to be moved with a given amount of power. These polyolefin drag reducers display flow enhancing characteristics not present in commonly known crystalline, largely non-hydrocarbon soluble polymers such as polyethylene and polypropylene.

It is known that these polyalphaolefin drag reducers are susceptible to degradation by shear when dissolved in the flowing hydrocarbon in the conduit. Accordingly, pumps, constrictions in the conduit, or the like which result in excessive turbulent flow lead to degradation of the polymer thereby decreasing its effectiveness. Thus, it is necessary that the drag reducing compositions be introduced into the flowing hydrocarbon stream in a form which achieves certain desirable features.

First of all, the drag reducing compositions should be in a form that is easy to transport and handle without special equipment since injection points for the drag reducing compositions into the flowing hydrocarbon stream are often at remote and inaccessible locations. Secondly, the polymer must be in a form which dissolves rapidly in the hydrocarbon stream flowing in the conduit since the polyalphaolefins have little drag reducing effect until solubilized in the hydrocarbon stream. Lastly, the drag reducing composition should impart no deleterious effects to the hydrocarbon. For example, in the case of crude oil flowing through a pipeline, certain amounts of material and contaminants can be tolerated unlike in finished pipeline products such as diesel fuel, gasoline and other hydrocarbon materials resulting from refining operations.

SUMMARY OF THE INVENTION

In one aspect, the present invention provides drag reducing compositions which, eliminate agglomeration and heat stability problems.

In another aspect, the present invention provides a drag reducing composition containing polyolefin, and a carrier or suspending medium comprising an ester alcohol.

In still another aspect, the present invention provides a method of reducing drag in a conduit conveying a liquid hydrocarbon comprising introducing into the conduit an effective amount of a drag reducing composition described above.

These and further features and advantages of the present invention will become apparent from the following detailed description, wherein reference is made to the figures in the accompanying drawings.

DETAILED DESCRIPTION OF PREFERRED EMBODIMENTS

Polymers which are used to prepare the finely divided polymer particles used in the drag reducing compositions of the present invention are obtained by polymerizing or copolymerizing mono-olefins containing from about 2 to about 30 carbon atoms. More usually, the mono-olefins, which are preferably alpha olefins, used in the preparation of the friction-reducing polymers used in the drag reducing compositions of the present invention contain from about 4 to about 20 carbon atoms, most preferably from about 6 to about 14 carbon atoms.

Any of several well known methods for polymerizing the mono-olefins may be employed to produce the polymeric/copolymeric friction-reducing agents used in the drag reducing compositions of the present invention. A particularly suitable method is the Ziegler-Natta process which employs a catalyst system comprising the combination of a compound of a metal of Groups IVb, Vb, VIb, or VIII of the Periodic Table of Elements, with an organo metal compound of a rare earth metal or a metal from Groups Ia, IIa, and IIIb of the Periodic Table of Elements. Particularly suitable catalyst systems are those comprising titanium halides and organo aluminum compounds. A typical polymerization procedure is to contact the monomeric mixture with a catalyst in a suitable inert hydrocarbon solvent for the monomers and the catalyst in a closed reaction vessel at reduced temperatures autogenous pressure and in a nitrogen or inert atmosphere. Methods and catalysts used in the preparation of polyolefin drag-reducing polymers useful in the present invention are disclosed in the following U.S. Pat. Nos. 4,289,679; 4,358,572; 4,415,704; 4,433,123; 4,493,903; and 4,493,904, all of which are incorporated herein by reference for all purposes. Polyalphaolefins used in the drag reducing compositions of the present invention can be produced by a so-called solution polymerization technique, or by bulk polymerization methods as described, for example, in U.S. Pat. No. 5,539,044, the disclosure of which is incorporated herein by reference for all purposes.

The polymers which are used in preparing the drag reducing compositions of the present invention are generally those of high molecular weight, the only limitation on the molecular weight being that it must be sufficient to provide effective friction reduction in the flowing stream of hydrocarbon in a conduit. In general, the effectiveness of the polymer composition to reduce friction increases as the molecular weight increases. On the upper end of the scale, the molecular weight of the polymers used in the process of the invention is limited only by the practicability of making the polymers. The average molecular weight of the desirable polymers is usually over 100,000 and is generally in the range of from about 100,000 to about 30 million. The average molecular weight of the polymers used in the processes and compositions of the present invention is preferably in the range of about 10 to about 25 million. In general, useful polyolefins in the present invention can be characterized as ultra-high molecular weight non-crystalline polymers.

Generally speaking, the drag reducing compositions of the present invention will contain from about 10 to 45%, preferably 20 to 41% by weight of the polyolefin produced as described above, be it a solution or bulk polymerized polymer. Unless otherwise specified, all percentages herein are by weight and refer to the weight of the drag reducing compositions.

In addition to the polyolefin friction reducing agent, the drag reducing compositions of the present invention can contain a coating or partitioning agent, e.g., a wax. The term "wax" includes any low melting, e.g., <500° C., organic mixture or compound of high molecular weight which is solid at ambient temperature. The waxes contemplated by the present invention can be natural, i.e., derived from animal, vegetable, or mineral sources, e.g., fatty acid waxes, or synthetic as, for example, ethylenic polymers, waxes obtained from the Fischer-Tropsch synthesis, etc. Non-limiting examples of suitable waxes include paraffin, micro-crystalline wax, slack or scale wax, polymethylene wax, polyethylene wax, fatty acid wax, etc. Typically, the waxes used in the compositions of the present invention are hydrocarbon in nature and are powders or particulates at room temperature. In addition to waxes, non-limiting examples of other suitable coating agents include talc, alumina, metal salts of a fatty acid, e.g., metal stearates, silica gel, polyanhydride polymers, etc. It will be understood that the term "coating agent" is intended to and does include components which while not actually coating the polymeric friction reducing agent, interact with the polymeric reducing agents in such a way, be it chemical or physical, which prevents the polyolefin, when ground to a desired particle size, from agglomerating to the extent that the agglomerated material constitutes a solid or substantially solid non-dispersable mass.

Generally speaking and when used, the coating or partitioning agent will be present in the compositions of the present invention in an amount of from about 0.1 to about 25% by weight, preferably from about 4 to about 10% by weight.

In addition to the polyolefin including a partitioning agent, the compositions of the present invention comprise a liquid carrier or suspending medium in which the polymeric components is insoluble. In particular, the carrier or suspending medium of the present invention comprises 2,2,4-trimethyl-1,3-pentanediol monoisobutyrate, optionally and preferably with about 0 to 10% by weight of water, preferably about 3 to about 7% by weight of water. The ester alcohol of the present invention is marketed commercially under the name Texanol by Eastman Chemical Company. While the ester alcohol of the present invention is used in a variety of applications, and in particular, in latex paints, Applicants have found that it provides an excellent carrier for use in the drag reducing compositions of the present invention and provides surprising results.

Albeit that the ester alcohol has 12 carbon atoms, the ester alcohol of the present invention is a liquid at room temperature and remain liquid at temperatures below −50° F. A particular advantage of the ester alcohol of the present invention is that unlike straight and branched chain alcohols containing 8 or more carbon atoms which dissolve the polymeric drag reducer, it has been unexpectedly found that the ester alcohol of the present invention does not dissolve the polymer. In this regard, an unexpected benefit of the use of the ester alcohol of the present invention is that even at high temperatures, i.e., 120 to 160° F., it does not dissolve the polyolefin drag reducer. It is known, for example, that prior art drag reducers which employ alcohols having 8 or more carbon atoms will dissolve some of the polyolefin drag reducer at higher temperatures. This makes such products particularly undesirable, for example, in pipelines in the Middle East, where temperatures can rise to 120-130° F. This is an unexpected finding since the skilled artisan would have believed that the ester alcohols of the present invention having 12 carbon atoms would have reacted in a similar fashion vis-à-vis dissolving polyolefin drag reducing polymer in the same fashion that straight and branched chain alcohols having 8 or more carbon atoms do. Further, the ester alcohol's property of remaining liquid at temperatures below −50° F. make it ideal for cold weather application.

The composition of the present invention can also include, with advantage, rheology modifier and/or thickening agents, non-limiting examples of which include guar gum, guar gum derivatives, hydroxylmethyl cellulose, xanthan gums, polyacrylamides, hydroxylpropyl cellulose, modified starches, and polysaccharides. When employed, the thickening agents will generally be present in an amount of from about 0.01 to about 1.0 wt %, preferably from about 0.25 to about 0.5 wt %.

The compositions of the present invention can also include with advantage, a biocide in an amount of from about 0.01 to about 0.5 wt %, preferably from about 0.05 to about 0.3 wt %. Non-limiting examples of typical biocides include: glutaraldehyde, a glutaraldehyde/quaternary ammonium compound blend, isothiazolin, tetrakishydromethyl phosphonium sulfate (THPS), 2,2-dibromo-3-nitrilopropionamide, bronopol and mixtures thereof.

In one method of preparing the compositions of the present invention, the drag reducing polymeric agent is ground at cryogenic temperatures to produce finely divided free flowing particulate polyolefin material. The term "cryogenic temperatures" means temperatures below the glass transition temperature of the polymer or copolymers which are being subjected to grinding. For example, when the polyolefin friction-reducing agent is a high molecular weight polymer (1-decene), the cryogenic temperature is below about −60° C. The temperature employed in carrying out the grinding operation can vary depending on the glass transition point of the particular polymer or polymers used. However, such temperatures must be below the lowest glass transition point of the polymer. Any commercial grinders which are capable of producing finely subdivided particles from solids may be used in producing the free flowing, particulate polyolefin material. Examples of suitable grinders include impact mills, rod mills, ball mills, and the like. The particle size of the resulting particulate polyolefin material can be controlled by methods well known in the art such as by varying the grinding speed, controlling the time of grinding, employing a grinding aid, etc. Techniques for cryogrinding drag reducing particulate polyolefins are disclosed in U.S. Pat. Nos. 4,837,249; 4,826,728; and 4,789,383, all of which are incorporated herein by reference for all purposes. Depending upon the storage, handling and transportation temperatures to which the friction reducing compositions of the present invention are subjected, it may not be necessary, as noted above, to include a coating agent. However, generally speaking a coating agent will be employed and in this regard the present invention contemplates that at least a part of the coating agent may be added as part of the cryogrinding step. Alternatively, the polymer can be cryoground in the absence of any coating agent and the coating agent and the cryoground polymer added separately to the aqueous suspending medium. Thus, for example, cryoground poly alpha olefin friction reducing agent could be added directly to the suspending medium together with wax or some other coating agent. Indeed, it has been found that a stable non-agglomerating composition can be achieved in this manner. However, in the usual case, the cryogrinding of the poly alpha olefin will occur in the presence of at least a portion of the coating agent, the remainder of the coating agent, if needed, being added to the suspending medium together with the cryoground poly alpha olefin.

Other methods of grinding or forming particulate drag reducing polymer are disclosed in U.S. Pat. Nos. 6,894,088; 6,946,500; 7,271,205; and U.S. Publication 2006/0276566, the disclosures of which are incorporated herein by reference for all purposes.

The compositions of the present invention can also include emulsifiers although typically emulsifiers are not necessary.

The stable, non-agglomerating compositions of the present invention flow easily and can be readily injected into a pipeline or conduit containing flowing hydrocarbons without any special equipment. Generally, the drag reducing compositions of the present invention can be added to the flowing hydrocarbon fluid by continuous injection by means of proportioning pumps situated at desired locations along the conduit in which the hydrocarbon is flowing.

The hydrocarbon fluids in which friction loss may be reduced by addition of the drag reducing compositions of the present invention include such materials as crude oils, gas oils, diesel oils, fuel oils, refined liquid hydrocarbon stream, asphaltic oils, and the like, varying from materials with relatively low viscosity, pure materials to high viscosity hydrocarbon containing fractions.

The amount of polyolefin friction-reducing agent used for reducing drag in a pipeline or conduit is usually expressed as ppm (parts by weight of polymer per million parts by weight of hydrocarbon fluid). The amount of a polyolefin friction reducing agent required to product the desired drag reduction will vary depending upon the physical properties and composition of the hydrocarbon fluid. Thus, the desired result may be obtained by the addition of as little as two ppm or less of the polymer. Conversely, some high viscosity fluids may require as much as 1,000 ppm or even up to 10,000 ppm of the polyolefin friction reducing agent to achieve desired drag reduction. Generally, it is preferred to add the polyolefin friction reducing agent in amounts of from about 2 to about 500 ppm and most preferably amounts from about 1 to about 100 ppm.

Non-limiting examples of drag reducing formulations according to the present invention are given below in Table 1. Unless otherwise specified all percentages are by weight.

TABLE 1

|  | Polymer | Coating Agent | Ester alcohol | Water |
| --- | --- | --- | --- | --- |
| Formulation 1 | 25.9% | 4.8% | 62.4% | 6.9% |
| Formulation 2 | 25.9% | 4.8% | 65.8% | 3.5% |

All formulations were tested and exhibit excellent drag reduction properties and stability which was determined visually. Formulations tested at 160° F. showed no discernible dissolution of the polymer drag reducer. Finally, formulations tested also showed a pour point between −44° F. and −49° F.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A drag reducing composition comprising:
    a finely divided, solid polyolefin friction-reducing agent formed from monolefins containing from 2 to 30 carbon atoms;
    a suspending medium, said suspending medium comprising 2,2,4-trimethyl-1,3-pentanediol monoisobutyrate containing from about 0 to about 10% by weight water, said suspending medium being present in an amount to provide a flowable suspension of said polyolefin friction-reducing agent.

2. The composition of claim 1, comprising from about 10 to about 45% by weight friction-reducing agent, and from about 50 to about 80% by weight suspending medium.

3. The composition of claim 1, comprising from about 0.1 to about 25% by weight of a coating agent.

4. The composition of claim 1, wherein said polyolefin friction reducing agent is produced by bulk polymerization.

5. The composition of claim 1, wherein said suspending medium comprises from about 3 to about 7% by weight water.

6. The composition of claim 1, further comprising:
    a biocide.

7. The composition of claim 6, wherein said biocide is present in an amount of from about 0.01 to about 0.5% by weight.

8. A method of reducing drag in a flowing hydrocarbon stream comprising:
    introducing into said hydrocarbon stream an amount of a drag reducing composition sufficient to produce a desired amount of drag reduction, said composition comprising:
    a finely divided, solid polyolefin friction-reducing agent formed from monolefins containing from 2 to 30 carbon atoms;
    a suspending medium, said suspending medium comprising 2,2,4-trimethyl-1,3-pentanediol monoisobutyrate containing from about 0 to about 10% by weight water, said suspending medium being present in an amount to provide a flowable suspension of said polyolefin friction-reducing agent.

9. The method of claim 8, comprising from about 10 to about 45% by weight friction-reducing agent, and from about 50 to about 80% by weight suspending medium.

10. The method of claim 8, comprising from about 0.1 to about 25% by weight of a coating agent.

11. The method of claim 8, wherein said polyolefin friction reducing agent is produced by bulk polymerization.

12. The method of claim 8, wherein said suspending medium comprises from about 3 to about 7% by weight water.

13. The method of claim 8, further comprising:
    a biocide.

14. The method of claim 13, wherein said biocide is present in an amount of from about 0.01 to about 0.5% by weight.

15. The method of claim 8, wherein said drag reducing composition is added to said hydrocarbon stream in an amount to provide from about 2 to about 500 parts by weight of drag reducing polymer per million parts by weight of hydrocarbon fluid in said hydrocarbon stream.

* * * * *